United States Patent
Takeda

(10) Patent No.: US 8,155,843 B2
(45) Date of Patent: Apr. 10, 2012

(54) VEHICLE CONTROL APPARATUS AND VEHICLE CONTROL SYSTEM USING THE SAME

(75) Inventor: Toshihiko Takeda, Chiryu (JP)

(73) Assignee: Denso Corporation, Kariya (JP)

( * ) Notice: Subject to any disclaimer, the term of this patent is extended or adjusted under 35 U.S.C. 154(b) by 535 days.

(21) Appl. No.: 12/341,185

(22) Filed: Dec. 22, 2008

(65) Prior Publication Data

US 2009/0164071 A1 Jun. 25, 2009

(30) Foreign Application Priority Data

Dec. 21, 2007 (JP) ................................ 2007-330540

(51) Int. Cl.
*G06F 7/00* (2006.01)

(52) U.S. Cl. ........................................................ 701/48

(58) Field of Classification Search ................... 701/48, 701/51, 53, 54
See application file for complete search history.

(56) References Cited

U.S. PATENT DOCUMENTS

| | | | |
|---|---|---|---|
| 5,513,107 A * | 4/1996 | Gormley | 701/48 |
| 6,847,864 B2 | 1/2005 | Goto et al. | |
| 6,859,708 B2 | 2/2005 | Hashimoto et al. | |
| 7,074,160 B1 | 7/2006 | Inoue et al. | |
| 7,228,213 B2 | 6/2007 | Sakai et al. | |
| 2006/0089963 A1 | 4/2006 | Vollmer et al. | |
| 2006/0111825 A1 | 5/2006 | Okada et al. | |
| 2008/0071447 A1 | 3/2008 | Uraki | |
| 2009/0055046 A1 * | 2/2009 | Harumoto et al. | 701/36 |
| 2009/0217897 A1 * | 9/2009 | Hartmann et al. | 123/179.3 |

FOREIGN PATENT DOCUMENTS

| | | |
|---|---|---|
| DE | 10 2005 055 173 | 5/2006 |
| DE | 10 2005 009 640 | 9/2006 |
| EP | 0 906 845 | 4/1999 |
| EP | 1 226 993 | 7/2002 |
| EP | 1 862 357 | 12/2007 |
| EP | 1862357 A1 | 12/2007 |
| GB | 2 273 580 | 6/1994 |
| JP | H03-128542 | 5/1991 |
| JP | H06-324138 | 11/1994 |
| JP | H09-160602 | 6/1997 |
| JP | H11-027297 | 1/1999 |
| JP | H11-334494 | 12/1999 |
| JP | 2001-239901 | 9/2001 |

(Continued)

OTHER PUBLICATIONS

Japanese Office Action dated Aug. 18, 2009, issued in corresponding Japanese Application No. 2007-330540, with English translation.

(Continued)

*Primary Examiner* — Faye M. Fleming

(74) *Attorney, Agent, or Firm* — Nixon & Vanderhye P.C.

(57) ABSTRACT

A vehicle control apparatus is provided, which comprises a mode setting unit and a control adjusting unit which are mounted in a vehicle. The vehicle is provided with control units that control behavior of a subject to be controlled which is mounted on a vehicle by each functional domain of the vehicle. The mode setting unit is provided independently from the control units and sets a vehicle mode depending on a vehicle environment in which the vehicle is placed. The control adjusting unit is also provided independently from the control units and adjusts behavior control performed by the control units based on the vehicle mode.

28 Claims, 11 Drawing Sheets

FOREIGN PATENT DOCUMENTS

| | | |
|---|---|---|
| JP | 2002-158664 | 5/2002 |
| JP | 2002-175597 | 6/2002 |
| JP | 2003-018163 | 1/2003 |
| JP | 2004-017676 | 1/2004 |
| JP | 2004-122943 | 4/2004 |
| JP | 2004-330891 | 11/2004 |
| JP | 2004-538559 | 12/2004 |
| JP | 2005-123766 | 5/2005 |
| JP | 2005-191789 | 7/2005 |
| JP | 2005-291173 | 10/2005 |
| JP | 2006-027382 | 2/2006 |
| JP | 2006-264472 | 10/2006 |
| JP | 2006-290168 | 10/2006 |
| JP | 2006-297994 | 11/2006 |
| JP | 2007-028377 | 2/2007 |
| JP | 2007-118945 | 5/2007 |
| WO | WO 2006/109139 A1 | 10/2006 |
| WO | WO 2007/107361 | 9/2007 |

OTHER PUBLICATIONS

Extended European Search Report dated Apr. 22, 2009, issued in corresponding European Application No. 08022195.5-1264.

* cited by examiner

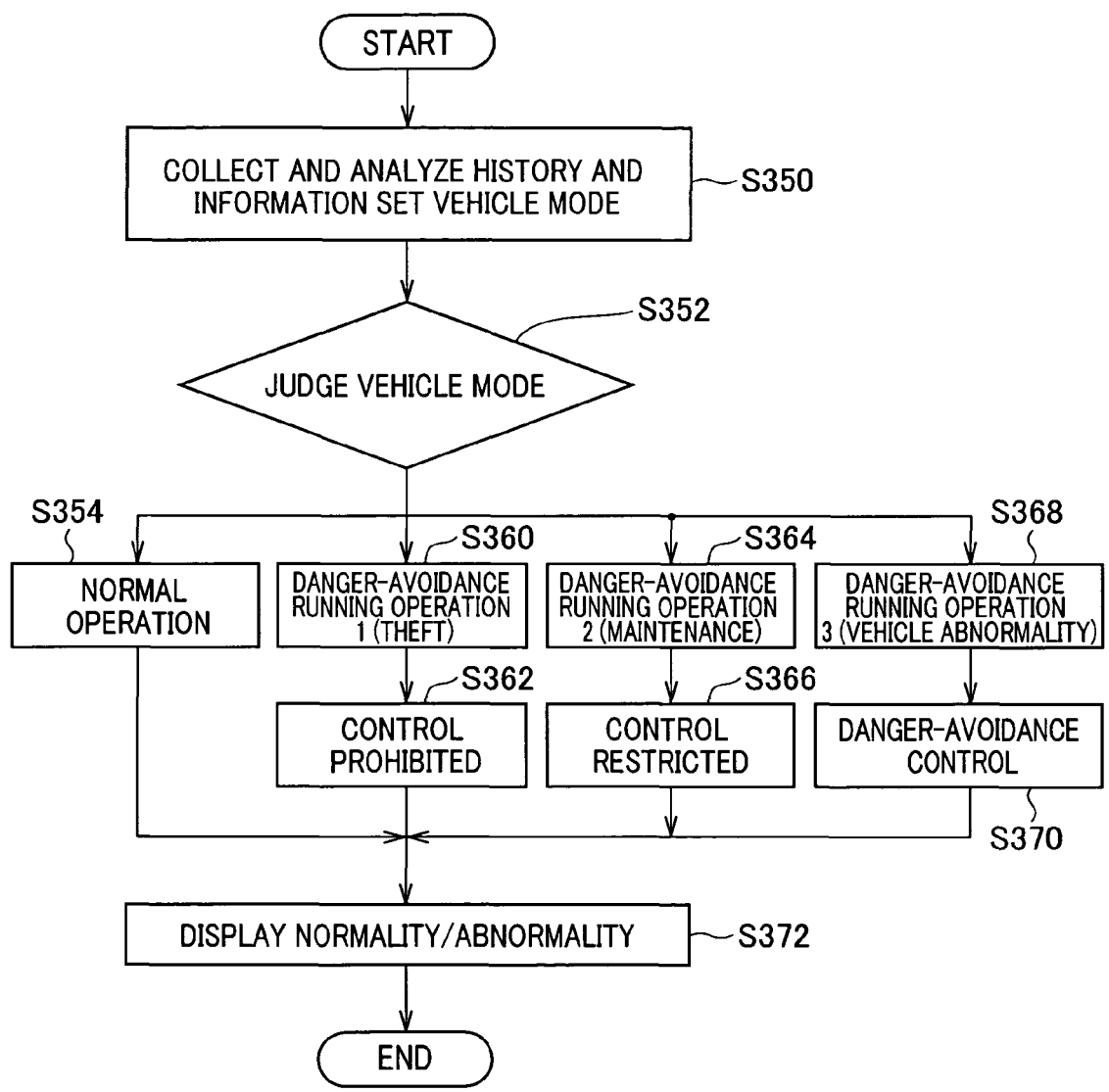

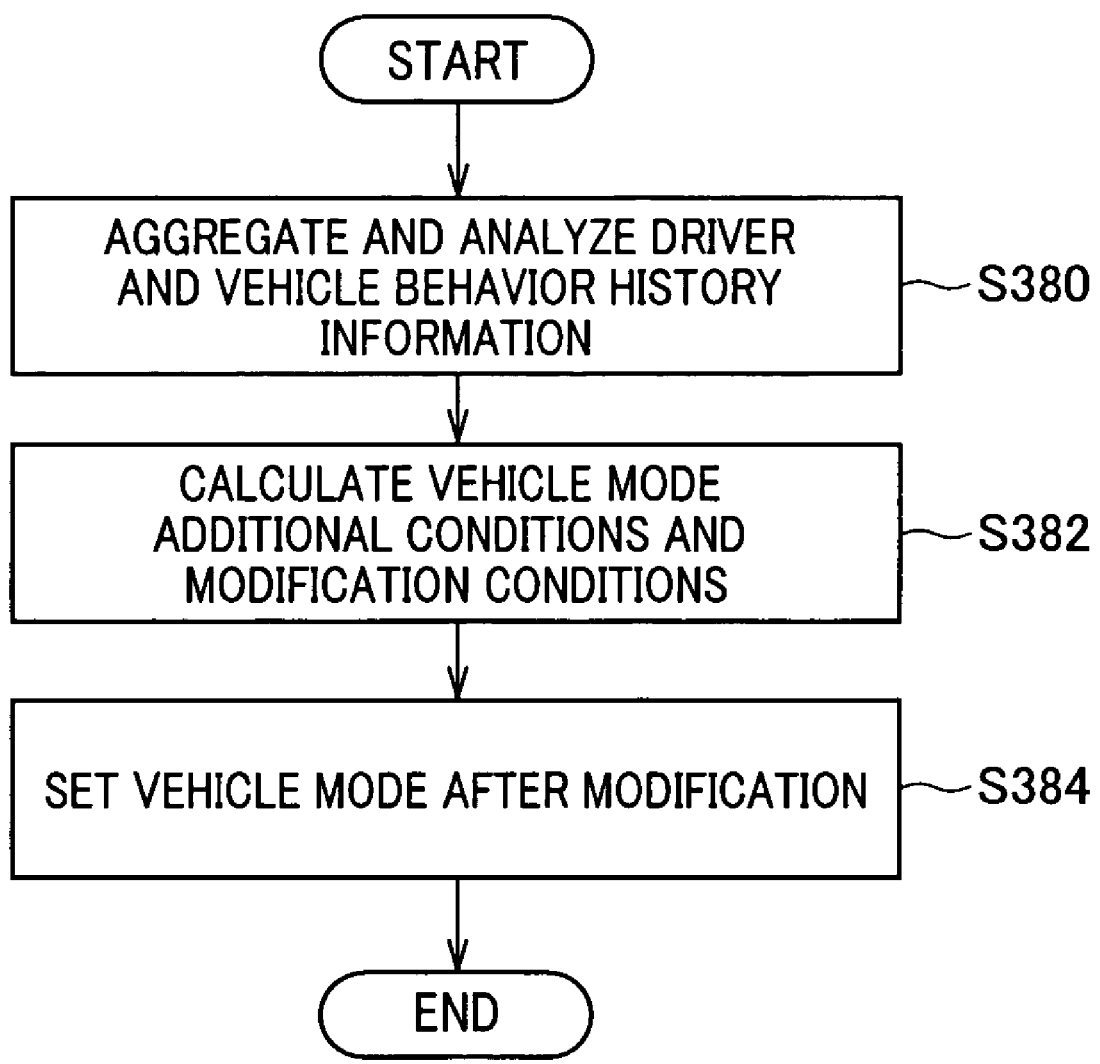

VEHICLE CONTROL APPARATUS AND VEHICLE CONTROL SYSTEM USING THE SAME

CROSS-REFERENCE TO RELATED APPLICATION

This application is based on and claims the benefit of priority from earlier Japanese Patent Application No. 2007-330540 filed Dec. 21, 2007, the description of which is incorporated herein by reference.

BACKGROUND OF THE INVENTION

1. Field of the Invention

The present invention relates to a vehicle control apparatus and a vehicle control system using the vehicle control apparatus that adjust is behavior control performed on subjects to be controlled which are mounted on a vehicle by control units which are responsible for performing subject control every functional domain given to a vehicle.

2. Description of the Related Art

Conventionally, a vehicle is known that uses control apparatuses to control subjects to be controlled of the vehicle based on a vehicle state detected by a sensor and the like (refer to, for example, Japanese Patent Laid-open Publication No. 2007-118945). A control apparatus is provided for each subject to be controlled. The subjects are, for example, a braking system, a steering system, and a driving system. In the above publication, an order of priority of the subjects to be controlled is set for each of a plurality of control conditions. When energy consumption by a subject to be controlled reaches a set value, energy supplied to the subjects to be controlled is adjusted based on the order of priority.

An on-vehicle equipment control apparatus that performs integrated control of on-vehicle equipment based on a current vehicle state is also known (refer to, for example, Japanese Patent Laid-open Publication No. 2006-264472).

However, in the above publication No. 2007-118945, adjustment control of energy provided to the subjects to be controlled is merely performed in adherence to the order of priority. Therefore, a problem is present in that, once the order of priority is set, energy adjustment control is always performed in the same sequence.

In the above publication No. 2006-264472, a control processing section of the on-vehicle equipment control unit controls the on-vehicle equipment serving as subjects to be controlled, based on vehicle conditions. Therefore, a problem is present in that a configuration of the control processing section controlling the on-vehicle equipment is required to be changed when a configuration of the on-vehicle equipment is changed.

SUMMARY OF THE INVENTION

The present invention has been achieved to solve the above-described problems. An object of the present invention is to provide a vehicle control apparatus and a vehicle control system using the vehicle control apparatus, which appropriately adjust behavior control performed on a subject to be controlled by functional-domain control type of control units based on a vehicle environment, and reduce an amount of work required to accommodate a change in a configuration of the control units.

In a first aspect according to the present invention, a mode setting unit sets a vehicle mode based on a vehicle environment, and a control adjusting unit adjusts behavior control performed on subjects to be controlled by control units every function domain given to the vehicle.

As a results the control adjusting unit can appropriately adjust the behavior control performed on the subjects to be controlled by the control units based on the vehicle mode set in accordance to changing vehicle environments.

The mode setting unit and the control adjusting unit are provided independently from the control units. Therefore, the vehicle control apparatus can accommodate a change in the configuration of the control units with little amount of work, for example, by acquiring configuration information, even when the configuration of the control units changes.

In a second aspect according to the present invention, the vehicle environment used to set the vehicle mode is at least one of a running state of the vehicle and an environmental condition of the vehicle.

The running state refers to, for example, a traveling speed and a driving mode set by a driver, the driving mode including a low power consumption mode, a sports mode, and the like. The peripheral condition of the vehicle refers to, for example, the weather in the vicinity of vehicle, a type of road on which the vehicle is traveling, an area through which the vehicle is traveling, the vehicle being parked, the vehicle being transported, and the vehicle being stolen. The control adjusting unit can adjust the behavior control performed by the control units in accordance with the various vehicle environments, based on the vehicle mode.

In the vehicle control system, a plurality of control units may control the behavior of the same subject to be controlled in coordination. In this case, a coordination control unit coordinates the behavior controls performed on the subject to be controlled by the plurality of control units. The coordinated control performed by the coordinated controlling means is control dependent on the behavior controls performed on the subjects by the control units.

Even when the coordination control unit controls the coordination of the behavior controls performed by the plurality of control units in this way, in a third aspect according to the present invention, the control adjusting unit adjusts the behavior controls performed by the control units and the coordinated control performed by the coordination control unit based on the vehicle mode.

As a result, effects achieved according to the first aspect can also be achieved in a system configuration in which the coordination control unit is provided.

In a fourth aspect according to the present invention, a resource managing unit of the control adjusting unit manages resources used by the control units and the coordination control unit based on the vehicle mode and a resource distribution instruction from the coordination control unit. The resource distribution instruction gives an instruction to distribute the resources among the control units based on the vehicle mode.

The coordination control unit, instead of the resource managing unit, gives the instruction to distribute the resources among the control units. Therefore, processing load placed on the resource managing unit managing the resources used by the control units and the coordination control unit is reduced.

In a fifth aspect according to the present invention, the resource managing unit included in the control adjusting unit manages resources used by the control units based on the vehicle mode. Therefore, an amount of resources consumed by the control units can be appropriately adjusted based on changing vehicle modes. As a result, the amount of resources consumed can be minimized.

In a sixth aspect according to the present invention, the resource managing unit manages the resources based on amounts of resources remaining that are respectively predicted for time spans of different lengths. As a result, the resources can be appropriately distributed based on the predicted amount of resources remaining for each time span of a different length, such as several milliseconds, several second, and several minutes.

In a seventh aspect according to the present invention, the mode setting unit sets the vehicle mode based on a history of vehicle environments. As a result, the resources can be appropriately managed by, for example, the amount of resource consumed being suppressed in accordance with the history of the vehicle environments.

In an eighth aspect according to the present invention, when an abnormality is found in the history of the vehicle environments, the mode setting unit sets the vehicle mode to an abnormal mode in which an instruction is given to perform a danger-avoidance running operation when the vehicle environment history is abnormal.

Because an abnormal state is judged based on the history of successive vehicle environments, the abnormal state can be appropriately judged even when the abnormality is not determined by a temporary vehicle environment.

Here, when the vehicle mode is set to the abnormal mode based on the history of the vehicle environments, the abnormal mode may be set through misjudgment of the history of the vehicle environments. For example, when the abnormal mode is entered because the driver is misidentified regardless of the vehicle being driven by a normal (qualified) driver, the misidentification does not in actuality significantly affect running of the vehicle. Therefore, although the vehicle cannot run normally because of being set to the abnormal mode, it is preferred that the vehicle is made to run in a state that is as similar as possible to a normal running operation.

In a ninth aspect according to the present invention, in the abnormal mode, an instruction is given to perform an initially set danger-avoidance operation. As a result, if misjudgment of the history of the vehicle environments is taken into consideration and an danger-avoidance running operation in which the vehicle is run in a state as similar to a normal running state as possible is set as an initial setting, the vehicle can be run in a state similar to the normal running state by the initially set dander-avoidance running operation.

In a tenth aspect according to the present invention, the mode setting unit sets a plurality of abnormal modes in which instructions are given to perform different danger-avoidance running operations, based on the abnormality in the history of the vehicle environments. As a result, an appropriate danger-avoidance running operation can be performed in accordance with the abnormality in the history of the vehicle environments.

In an eleventh aspect according to the present invention, one of the plurality of abnormal modes is a vehicle theft mode in which an instruction is given to stop running the vehicle. As a result, when the vehicle is stolen, the vehicle can be prohibited from running, and the vehicle can be stopped at the site of the theft.

In a twelfth aspect according to the present invention, in the vehicle theft mode, an instruction is given to notify a vehicle owner of a theft. Therefore, the vehicle owner can be immediately notified of the vehicle being stolen, for example, by an audio notification over a mobile phone and the like. As a result, the vehicle owner can quickly respond to the theft.

In a thirteenth aspect according to the present invention, one of the plurality of abnormal modes is a maintenance mode in which an instruction is given to suppress behavior of the subject to be controlled. As a result, when an abnormality requiring maintenance occurs, the behavior control performed by the control units can be adjusted such as to suppress the behavior of the subject to be controlled serving as a maintenance subject, and deterioration of the subject to be controlled can be minimized.

In a fourteenth aspect according to the present invention, in the maintenance mode, an instruction is given to notify a vehicle owner that maintenance is required to be performed. Therefore, the vehicle owner can be immediately notified when maintenance is required. As a result, the vehicle owner can quickly perform a process, such as taking the vehicle to a repair shop.

In a fifteenth aspect according to the present invention, the mode setting unit sets the vehicle mode for each driver based on the history of the vehicle environments of each driver. As a result, an appropriate vehicle mode in which an amount of resources consumed is reduced can be set in accordance with driving characteristics of each driver.

The mode setting unit can set the vehicle mode by switching vehicle modes, modifying the vehicle mode, and the like through, for example, collection and classification of history information on parameters of the driver that affects how a vehicle runs. The parameters include, for example, acceleration during startup after a traffic light changes from red to green, acceleration during a normal startup, a vehicular gap while the vehicle is running at a constant speed, deceleration and acceleration when a preceding vehicle stops, and deceleration and acceleration during a normal stop.

In a sixteenth aspect according to the present invention, the mode setting unit analyzes a usage probability of at least one vehicle environment in the history for each driver, and sets the vehicle mode for each driver based on the analysis results.

For example, the mode setting unit can predict a change in the vehicle environment and set the vehicle mode by setting the vehicle mode based on the analysis result of the usage probability of a running state, such as the traveling speed, for each driver. As a result, the mode setting unit can, for example, derive a vehicle mode from the initially set vehicle modes in adherence to the predicted change in the running state, and set an appropriate vehicle mode in which the amount of resources consumed can be reduced for each driver.

In a seventeenth aspect according to the present invention, the mode setting unit acquires a history of at least one vehicle environment for each driver from map information. As a result of the history of the vehicle environments being acquired from the map information having a high degree of correlation with the vehicle environments, a more appropriate vehicle mode can be set for each driver based on the results of the analysis on the history of vehicle environments.

In an eighteenth aspect according to the present invention, the resource managing unit instructs the driver to drive the vehicle in accordance with the vehicle mode. Therefore, in addition to resource management performed by adjustment of the behavior controls performed by the control units, the resources can be appropriately managed based on the vehicle mode through driving performed by the driver. As a result, the amount of resources consumed can be reduced even by the driving performed by the driver.

In a nineteenth aspect according to the present invention, the resource managing unit manages at least energy in the vehicle. As a result, energy stored in the vehicle and energy generated in the vehicle can be appropriately managed.

In a twentieth aspect according to the present invention, the resource managing unit manages electrical energy as at least one type of energy in the vehicle. As a result, consumption of electrical energy mainly stored in the vehicle can be appropriately managed based on the vehicle mode.

In a twenty-first aspect according to the present invention, the resource managing unit manages electrical energy based on two or more types of input and output time response characteristics.

For example, a capacitor is only capable of storing a small amount of power, but has a fast input and output time response. A battery is capable of storing a large amount of power, but has a slow input and output time response. The resource managing unit appropriately manages electrical energy in accordance with such differences in the input and output time response characteristics of electrical energy. For example, in a vehicle mode requiring electric energy to be quickly distributed, the electric energy is distributed from the capacitor having fast input and output time response characteristics. On the other hand, in a vehicle mode in which distribution does not require urgency, the electrical energy can be distributed from the battery having slow input and output time response characteristics.

In a twenty-second aspect according to the present invention, the resource managing unit manages heat energy as at least one type of energy in the vehicle. As a result, heat energy that is not conventionally effectively used in the vehicle can be effectively used, for example, for power generation using a heat turbine and for heating.

In a twenty-third aspect according to the present invention, the resource managing unit manages fuel for an internal combustion engine mounted on the vehicle as at least one type of energy in the vehicle. As a result, an amount of fuel consumed can be managed based on the vehicle mode, and fuel efficiency can be improved.

In a twenty-fourth aspect according to the present invention, the resource managing unit instructs the control units to switch an operating speed based on the vehicle mode, or the vehicle mode and at least one of an amount of energy remaining and a usage request value of the resources from the control units.

The energy consumption of the control units can be appropriately managed and suppressed by, for example, an instruction being given to switch a cycle of behavior control performed by the control units or a behavior control speed, such as an operation clock, based on the vehicle mode, or the vehicle mode and at least one of an amount of energy remaining and a usage request value of the resources from the control units.

In a twenty-fifth aspect according to the present invention, the resource managing unit manages the resources to be distributed to the control units based on the vehicle mode, or the vehicle mode and at least one of an amount of energy remaining and a usage request value of the resources from the control units.

The resources can be appropriately distributed to the control units in the order of priority of the functional domain controls among which the resources are distributed being set and an amount of resources distributed being set based on the vehicle mode, or based on the vehicle mode and at least one of the amount of resources remaining and resource usage request values from the control units.

In a twenty-sixth aspect according to the present invention, the resource managing unit instructs the control units to switch the amount of resources consumed based on the vehicle mode, or the vehicle mode and at least one of an amount of energy remaining and a usage request value of the resources from the control units.

Energy consumption of the control units can be appropriately managed by an amount of resource consumption being selected from among a large amount, a medium amount, and a small amount of resource consumption, based on the vehicle mode, or the vehicle mode and at least one of the amount of resources remaining and the resource usage values from the control units, and indicating the selected amount to the control units.

Each function of a plurality of means included in the present invention is actualized by hardware resources of which functions are designated by a configuration itself, hardware resources of which functions are designated by programs, or a combination of these hardware resources. Each function of the plurality of means is not limited to those actualized by hardware resources that are physically independent from each other.

BRIEF DESCRIPTION OF THE DRAWINGS

In the accompanying drawings:

FIG. 10 is a flowchart of an abnormality judgment routine 2; and

FIG. 11 is a flowchart of a vehicle mode setting routine.

DETAILED DESCRIPTION OF THE PREFERRED EMBODIMENTS

Embodiments of the present invention will hereinafter be described with reference to the diagrams.

Figure 1:
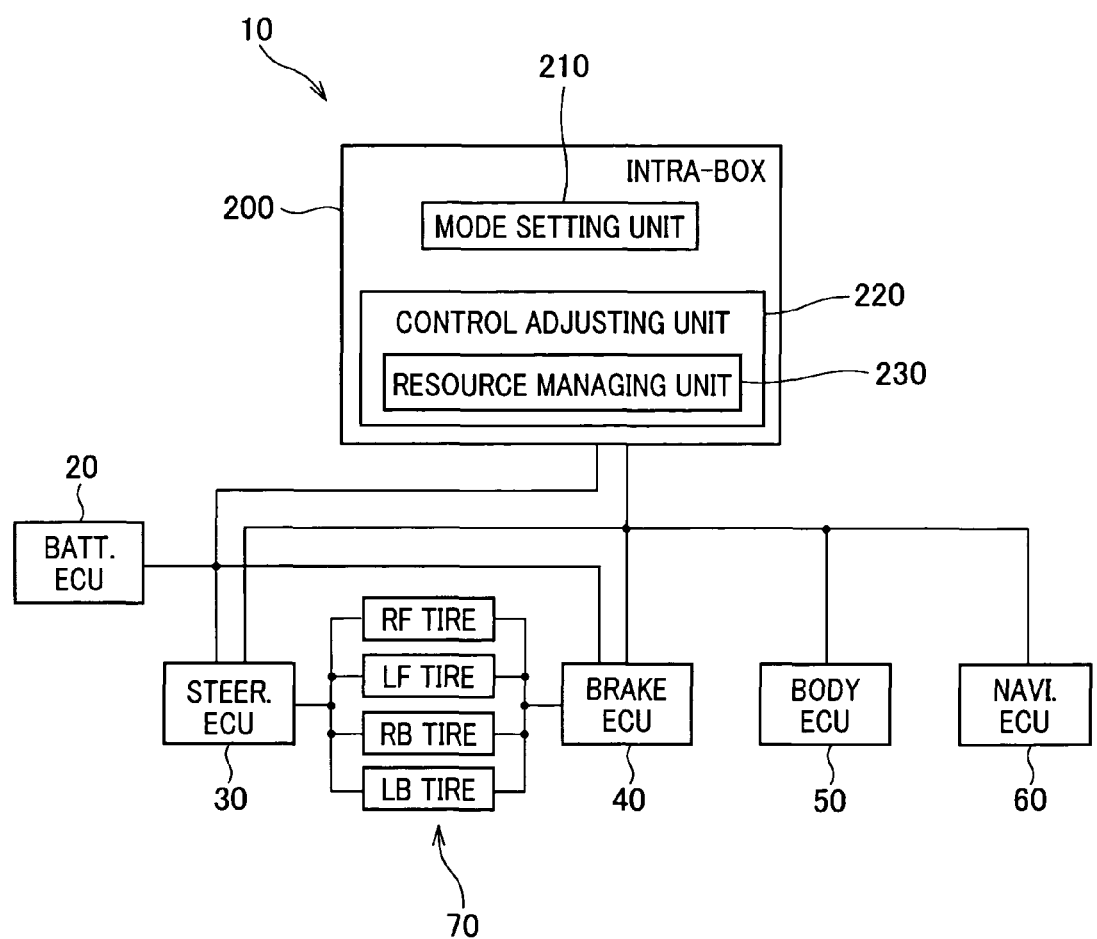
FIG. 1 is a block diagram of a vehicle control system according to an embodiment of the present invention.

FIG. 1 is a diagram of a vehicle control system 10 which uses a vehicle control apparatus, according to an embodiment of the present invention.

(Vehicle Control System)

The vehicle control system 10 shown in FIG. 1 includes a battery ECU (electronic control unit) 20, a steering ECU 30, a brake ECU 40, a body ECU 50, a navigation ECU 60, a processor called intra-box 200 (serving as a processor for common processes), and the like. The battery ECU 20, the steering ECU 30, the brake ECU 40, the body ECU 59, and the navigation ECU 60 are equivalent to the control units according to the present invention, which operate as functional-domain control type of controlling means for controlling behaviors of in-vehicle subjects to be controlled every functional domain of the vehicle. The intra-box 200 is equivalent to the vehicle control apparatus according to the present invention.

The battery ECU 20, the steering ECU 30, the brake ECU 40, the body ECU 59, and the navigation ECU 60 respectively control behavior of subjects to be controlled which are mounted on a vehicle, such as a power supply, a steering component, a brake, a vehicle body, and a router guidance audio and image device, by each functional domain. Functional domains are power supply control, steering control, brake control, vehicle body control, and audio and image control.

Figure 2:
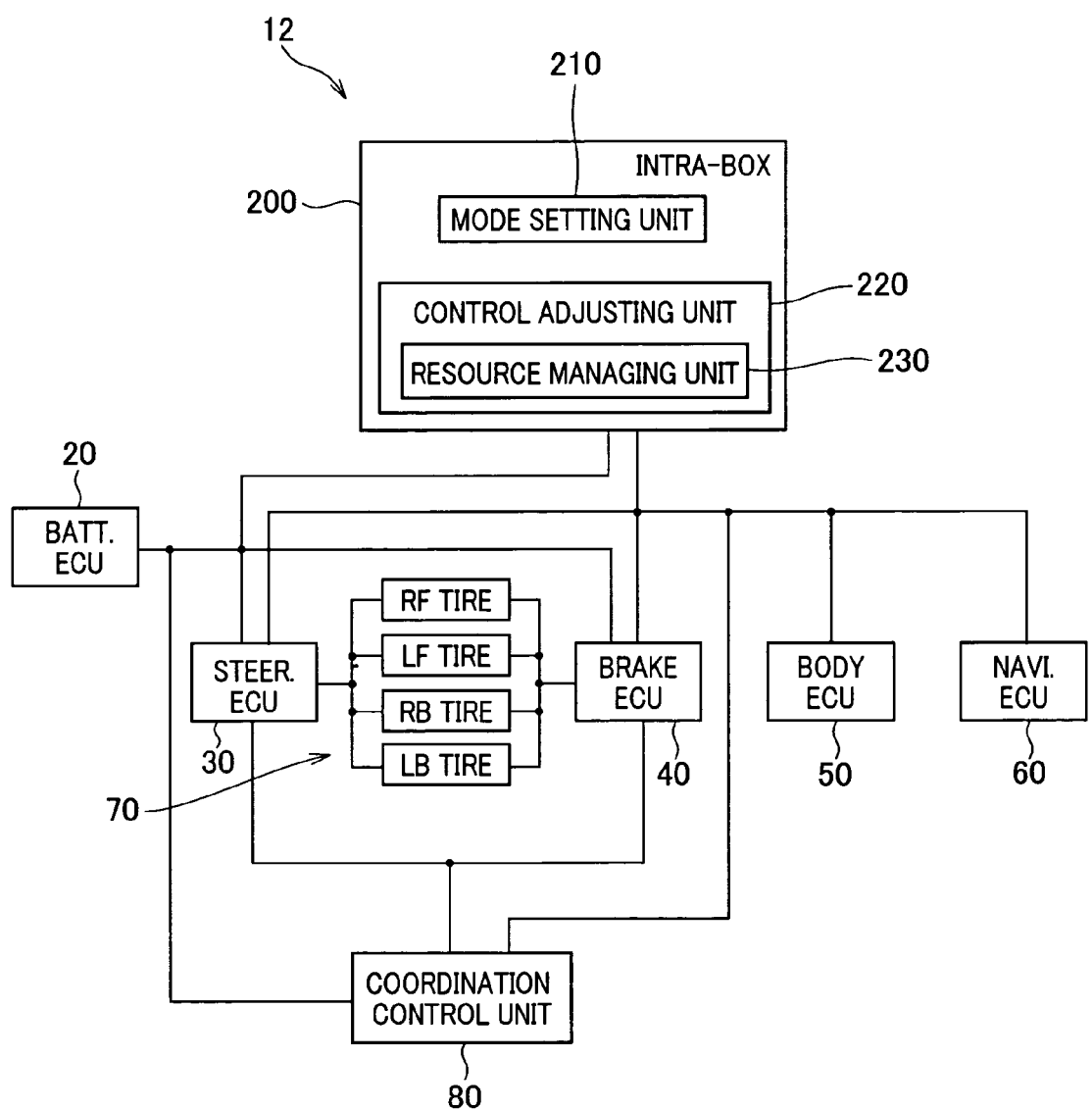
FIG. 2 is a block diagram of a vehicle control system using a coordination control unit.

As shown in FIG. 2, a coordination control unit 80 can be provided as a vehicle control system 12. The coordination control unit 80 controls coordinated behavior control that is, for example, performed on a same subject to be controlled, such as tires 70, by the steering ECU 30 and the brake ECU

40. The coordination control unit 80 controls coordination dependent on behavior control performed on the tires 70 by the steering ECU 30 and the brake ECU 40.

The coordination control unit 80 and each control unit (i.e., functional-domain control type of controlling means) communicate with the intra-box 200 over an on-vehicle local-area network (LAN).

The battery ECU 20 controls power supplied to the steering ECU 30, the brake ECU 40, the intra-box 200, and, in a configuration shown in FIG. 2, the coordination control unit 80. Power supplied to the body ECU 50 and the navigation ECU 60 is controlled by another battery ECU.

The steering ECU 30 controls a steering angle of each tire 70 based on a detection signal from an angle detecting sensor that detects a steering component steering angle.

The brake ECU 40 controls an amount of braking applied to each tire 70 based on a detection signal from a sensor that detects how far a brake pedal is pressed.

The body ECU 50 controls vehicle doors, air conditioning, and the like. The navigation ECU 60, for example, detects a vehicle position based on a satellite positioning system, such as a global positioning system (GPS), and map data, and retrieves routes to a destination of the vehicle. The navigation ECU 60 then displays an optimal route on an image device, such as a display, and provides guidance using audio.

(Intra-Box 200)

The intra-box 200, which is a processor using a computer, is provided independently from the above-described control units, such as the battery ECU 20, the steering ECU 40, the brake ECU 40, the body ECU 50, the navigation ECU 60, and, in the configuration in FIG. 2, the coordination control unit 80. The intra-box 200 performs common processes that are common among the behavior controls performed by individual control units. The intra-box 200 also performs, in the configuration in FIG. 2, common processes that are common between the behavior controls performed by the control units and coordinated control performed by the coordination control unit 80, and common processes that are independent of the behavior controls performed by the control units and the coordinated control performed by the coordination control unit 80. The common processes that are common between the behavior controls performed by the control units and the coordinated control performed by the coordination control unit 80 refer to processes that are common to both the behavior controls performed by the control units and the coordinated control performed by the coordination control unit 80, regardless of whether a single or a plurality of control units are present.

The intra-box 200 includes a mode setting unit 210, a control adjusting unit 220, and the like that perform the above-described common processes. The control adjusting unit 220 includes a resource managing unit 230. The mode setting unit 210 and the control adjusting unit 220 are provided independently from the control units, and, in the configuration in FIG. 2, the coordination control unit 80.

The mode setting unit 210 and the control adjusting unit 220 include a central processing unit (CPU), a read-only memory (ROM), a random access memory (RAM), a rewritable non-volatile memory, such as a flash memory, and the like (not shown). A control program allowing the intra-box 200 to function as each means, described below, is stored in a storage means, such as the ROM and the flash memory, of the intra-box 200.

(Mode Setting Unit)

(1) Vehicle Environment

The mode setting unit 210 sets a vehicle mode based on a vehicle environment in which the vehicle is placed. The vehicle environment refers to at least one of a running state of the vehicle and a peripheral condition. The running state of the vehicle refers to an environment based on the vehicle itself such as a traveling speed and a driving mode set by a driver. The driving mode includes a low power consumption mode, a sports mode, and the like. The peripheral condition of the vehicle refers to an environment in which the vehicle is placed, excluding that of the vehicle. Peripheral conditions are, for example, the weather in the vicinity of vehicle, a type of road on which the vehicle is traveling, an area through which the vehicle is traveling, the vehicle being parked, the vehicle being transported, the vehicle being stolen, and the like.

(2) History

The mode setting unit 210 can set the vehicle mode based on a past-to-current history of vehicle environments, in addition to the vehicle environment in which the vehicle is currently placed. As a result, the mode setting unit 210 can set an appropriate vehicle mode based on a history of successive vehicle environments rather than a temporary vehicle environment.

In addition to selecting the appropriate vehicle mode from existing vehicle modes that are initially set in advance, the mode setting unit 210 can set the vehicle mode by changing an existing vehicle mode and by adding a new vehicle mode based on vehicle environment history information.

(3) Driver-Specific History

The mode setting unit 210 can set the vehicle mode based on a vehicle environment history of each driver. As a result, the mode setting unit 210 can set an appropriate vehicle mode in accordance with driving characteristics of the driver, based on vehicle environments collected for each vehicle or for each driver when a vehicle is shared. The driver of the vehicle is identified by a fingerprint, a running pattern, and the like of the driver.

The mode setting unit 210 sets the vehicle mode by switching vehicle modes, modifying the vehicle mode, and the like through, for example, collection and classification of history information on parameters of the driver that affects how a vehicle runs. The parameters include acceleration during startup after a traffic light changes from red to green, acceleration during a normal startup, a vehicular gap while the vehicle is running at a constant speed, deceleration and acceleration when a preceding vehicle stops, and deceleration and acceleration during a normal stop.

When setting the vehicle mode based on the vehicle environment history of each driver, the mode setting unit 210 can analyze a usage probability of at least one vehicle environment, such as that of the traveling speed based on a history of the traveling speeds of each driver. Based on the analysis result, the mode setting unit 210 can successively change and set the vehicle mode.

The mode setting unit 210 can predict a change in the vehicle environment and set the vehicle mode by setting the vehicle mode based on the analysis result for each driver. As a result, the mode setting unit 210 can derive a vehicle mode from the initially set vehicle modes in adherence to the predicted change in the vehicle environment, and set an appropriate vehicle mode, such as that in which resource consumption can be reduced, for each driver.

The mode setting unit 210 can also acquire at least one vehicle environment, such as the area through which the vehicle is traveling or the type of road on which the vehicle is traveling, from map information from the navigation ECU 60 for each driver. Based on the acquired result, the mode setting unit 210 can successively change and set the vehicle mode.

(4) Abnormal Mode

A range and pattern of a traveling speed history and the like in a normal state differ from the range and pattern in an abnormal state. When an abnormality is found in the vehicle environment history, the mode setting unit 210 sets the vehicle mode to an abnormal mode in which an instruction is given for a danger-avoidance running operation. As a result of the abnormal mode being set in this way based on the vehicle environment history, the mode setting unit 210 can appropriately determine an abnormal state even when the abnormal state cannot be determined by a temporary vehicle environment.

The mode setting unit 210 preferably sets the vehicle mode to a plurality of abnormal modes in which instructions are given for different danger-avoidance running operations, based on the vehicle environment history. For example, the mode setting unit 210 can set the vehicle mode to an abnormal mode in which an instruction is given to perform a danger-avoidance running operation that restricts a maximum speed, an abnormal mode in which an instruction is given to stop the vehicle, or an abnormal mode in which an instruction is given to perform maintenance and inspection, based on the vehicle environment history.

The abnormal mode in which the instruction is given to stop the vehicle is set, for example, when a theft occurs in which a driver who is not registered in a driver driving history drives the vehicle. In the abnormal mode set during the theft, in addition to stopping the vehicle, an instruction is preferably given to notify an owner of the vehicle of the theft by mobile phone and the like.

In the abnormal mode in which the instruction is given to perform maintenance and inspection, the function domain controlling means is instructed to control behavior of the subject to be maintained, such as by reducing an amount of fuel injection, to prevent deterioration and wear of the subject to be controlled until maintenance and inspection is performed. In a manner similar to that when a theft occurs, in the abnormal mode in which the instruction is given to perform maintenance and inspection, an instruction is preferably given to notify the owner of the vehicle when maintenance and inspection is required.

When the mode setting unit 210 misjudges the vehicle environment history and sets the vehicle mode to the abnormal mode based on the misjudged vehicle environment history, a vehicle mode may be set in which a danger-avoidance running operation is performed that is inappropriate compared to that in the vehicle mode set when the vehicle environment history is correctly judged. In this case, although the vehicle cannot run normally, the danger-avoidance running operation can be performed in a state that is as similar as possible to a normal running operation. For example, when the driver misjudges the vehicle environment history, an abnormal mode is preferably set in which a danger-avoidance running operation similar to a normal running operation is performed, rather than the vehicle being stopped.

In this way, the mode setting unit 210 can take into consideration misjudgment of the vehicle environment history. When the mode setting unit 210 judges that the vehicle environment history is abnormal, the mode setting unit 210 can set the vehicle mode to the initially set abnormal mode in which the instruction is given to perform a danger-avoidance running operation, regardless of the type of abnormality in the vehicle environment history. The danger-avoidance running operation in the initially set abnormal mode is, for example, to run the vehicle in a state similar to a normal running state.

(Control Adjusting Unit)

The control adjusting unit 220 adjusts suspension and start of the behavior controls performed by the control units, based on the vehicle mode set by the mode setting unit 210. The control adjusting unit 220 also adjusts suspension and start of the coordinated control performed by the coordination control unit 80 in the configuration in FIG. 2. Overall or partial suspension and start of the behavior controls and the coordinated control can be performed.

As a result, the control adjusting unit 220 can appropriately adjust the behavior control performed by the control units corresponding to the subject to be controlled or the coordinated control performed by the coordination control unit 80 based on the changing vehicle environments.

The control adjusting unit 220 is provided independently from the control units and the coordination control unit 80. Therefore, even when the configuration of the control units changes, the change in the configuration of the control units can be accommodated with the minimum amount of work, such as by information on the change in the configuration of the control units being received via the on-vehicle LAN.

(Resource Managing Unit)

(1) Resource Management

The resource managing unit 230 provided in the control adjusting unit 220 manages resources used by the control units in the vehicle control system in FIG. 1, or the control units and the coordination control unit 80 in the vehicle control system 12 in FIG. 2, based on the vehicle mode.

Based on the changing vehicle modes, the resource managing unit 230 can adjust the behavior controls performed by the control units and the coordination control unit 80 and appropriately adjust resource consumption, thereby appropriately managing the amount of resources remaining for the resources consumed by the control units and the coordination control unit 80. As a result, the decrease in resources can be kept to a minimum.

The resource managing unit 230 preferably appropriately distributes resources to the control units by setting an order of priority of the functional domain controls among which the resources are distributed and setting a distribution amount based on the vehicle mode, or based on the vehicle mode and at least one of the amount of resources remaining and resource usage request values from the control units.

In the vehicle control system 12 including the coordination control unit 80, the resource managing unit 230 preferably manages the resources used by the control units and the coordination control unit 80 based on the vehicle mode and a resource distribution instruction through which the coordination control unit 80 gives an instruction to distribute the resources among the control units based on the vehicle mode.

The coordination control unit 80, instead of the resource managing unit 230, performs coordinated control of the amount of resources used, the order of priority for use of the resources, and the like of the control units, based on the vehicle mode and gives notifies the resource managing unit 230 through a resource request instruction. Therefore, processing load placed on the resource managing unit 230 managing the resources decreases.

(2) Resource Management Over Time Frame

Here, the amount of resources consumed by the control units and the coordination control unit 80, and the resulting amount of resources remaining are not constant over a time frame, but rather differ over a time span, such as several milliseconds, several seconds, and several minutes. Therefore, the resource managing unit 230 predicts the amount of resources consumed and the amount of resources remaining for each different time span. Based on the predicted results, the resource managing unit 230 distributes the resources among the control units and the coordination control unit 80. As a result, based on the predicted amount of resources remaining for each time span, the resources can be distributed over each time span.

(3) Energy Management

The resource managing unit 230 manages the amount consumed, the amount remaining, the amount distributed, and the order of priority for distribution of resources of the vehicle, such as electricity serving as energy, heat, and fuel, and other resources.

(3-1) Electrical Energy

For example, in a transport mode indicating that the vehicle is being transported, all power supply to sections of the vehicle excluding a driving system, such as the body ECU 50 and the navigation ECU 60, is stopped, thereby minimizing power consumption.

In a high-speed running mode indicating that the vehicle is traveling at a high speed, for example, control for opening and closing the trunk of the vehicle and control for opening and closing the doors of the vehicle are not required to be performed. Therefore, as a result of control of the opening and closing of the trunk and the control of the opening and closing of the trunk being stopped in the high-speed running mode, power consumption of a trunk open/close ECU and a door open/close ECU of the body ECU 50 can be reduced compared to when vehicle modes other than the high-speed running mode are set.

When various controls are switched between a sleep state and a wake-up state depending on the vehicle mode, the power consumption for control excluding the control for entering the wake-up state can be eliminated in the sleep state.

In this way, the resource managing unit 230 classifies control into control that required to be started and control that is not required to be started in each vehicle mode, and stops power supply to controls that are not required to be started. As a result, the resource managing unit 230 can appropriately manage the consumption of electrical energy mainly held in the vehicle, based on the vehicle mode.

When the ECU performing various controls periodically judges for itself whether to transition from the sleep state to the wake-up state, the operating speed of the ECU in the sleep state can be set to a low speed. As a result, suppression of electrical energy consumption can be appropriately managed based on the vehicle mode.

(3-2) Heat Energy

In addition to electrical energy, the resource managing unit 230 also preferably manages heat energy of the vehicle. As a result, the resource managing unit 230 can effectively use heat energy that is not conventionally effectively used in the vehicle, for example, for power generation using a heat turbine and for heating.

(3-3) Fuel Energy

In addition to electrical energy and heat energy, the resource managing unit 230 preferably manages the amount of consumption of fuel serving as energy in the vehicle. The resource managing unit 230 can increase fuel efficiency by managing the amount of fuel consumption such as to minimize consumption.

The resource managing unit 230 may manage only one type or two types of energy among the three types of energy: electrical energy, heat energy, and fuel energy.

(4) History-Based Resource Management

The resource managing unit 230 manages the resources based on the vehicle mode set by the mode setting unit 210 based on the vehicle environment history. The resource managing unit 230 can appropriately manage the resources based on the vehicle environment history by, for example, controlling the amount of resources consumed.

(5) Operation Instructions

The resource managing unit 230 can give instructions to perform operations for reducing the amount of resource consumption based on the vehicle mode set by the mode setting unit 210 through audio, the display, and the like.

(6) Switching Operating Speeds

The resource managing unit 230 can instruct the control units that can switch operation speeds, such as an operation clock, a behavior control duration, and a behavior control time interval, to switch the operating speeds based on the vehicle mode, or the vehicle mode and at least one of the amount of resources remaining and the resource usage request values from the control units.

(7) Switching Amount of Resources Consumed

The resource managing unit 230 can instruct the control units that can switch the amount of resources consumed to switch the amount of resources consumed based on the vehicle mode, or the vehicle mode and at least one of the amount of resources remaining and the resource usage request values from the control units.

The resource managing unit 230 can appropriately manage energy consumption by the control units by selecting among a large amount, a medium amount, and a small amount of resource consumption, based on the vehicle mode, or the vehicle mode and at least one of the amount of resources remaining and the resource usage values from the control units, and indicating the selected amount to the control units.

For example, regarding an air conditioning controlling means serving as a control units that controls behavior of an air conditioner in the vehicle, when a large amount of power is consumed by other control units with a higher priority than the air conditioning controlling means, and the amount of power remaining is below a predetermined value when the overall amount of power indicated by the requested value is supplied to the air conditioning controlling means, the resource managing unit 230 can instruct the air conditioning means to temporarily reduce power consumption to fall below the usage request value. Subsequently, the resource managing unit 230 can maintain air conditioning capability by supplementing the amount of power remaining with an amount of power usage restricted in accordance to a margin.

(8) Power Input and Output Time Response Characteristics

The resource managing unit 230 selects either a capacitor or a battery as a power supply that supplies power, based on the vehicle mode and in accordance with the degree of urgency and an amount of the power supplied. When the power is supplied quickly, the power is supplied from the capacitor that has a fast power input and output time response characteristic. When power supply does not require urgency and a large amount of power is supplied, the power is supplied from the battery that has a slower power input and output time response characteristic than the capacitor.

In addition to the power input and output time response characteristics, the resource managing unit 230 preferably manages the power to maintain an appropriate balance between power generation and consumption based on the vehicle mode, taking into consideration a degree of temporal freedom in power generation and generation efficiency of a power generator and a regenerating brake, the power consumption characteristics of each control units, and the like.

(Control Adjustment Routine)

Next, among control adjustment routines performed by the intra-box 200 to adjust behavior controls performed by the control units based on the vehicle mode, a resource managing routine, an abnormality judging routine, and a vehicle mode setting routine will be described with reference to FIG. 3 to FIG. 11. The routines shown in FIG. 3 to FIG. 11 are constantly performed. In each routine, "S" indicates a step. Steps at which a same process is essentially performed are given the same step number.

(Resource Management Routine 1)

Figure 3:
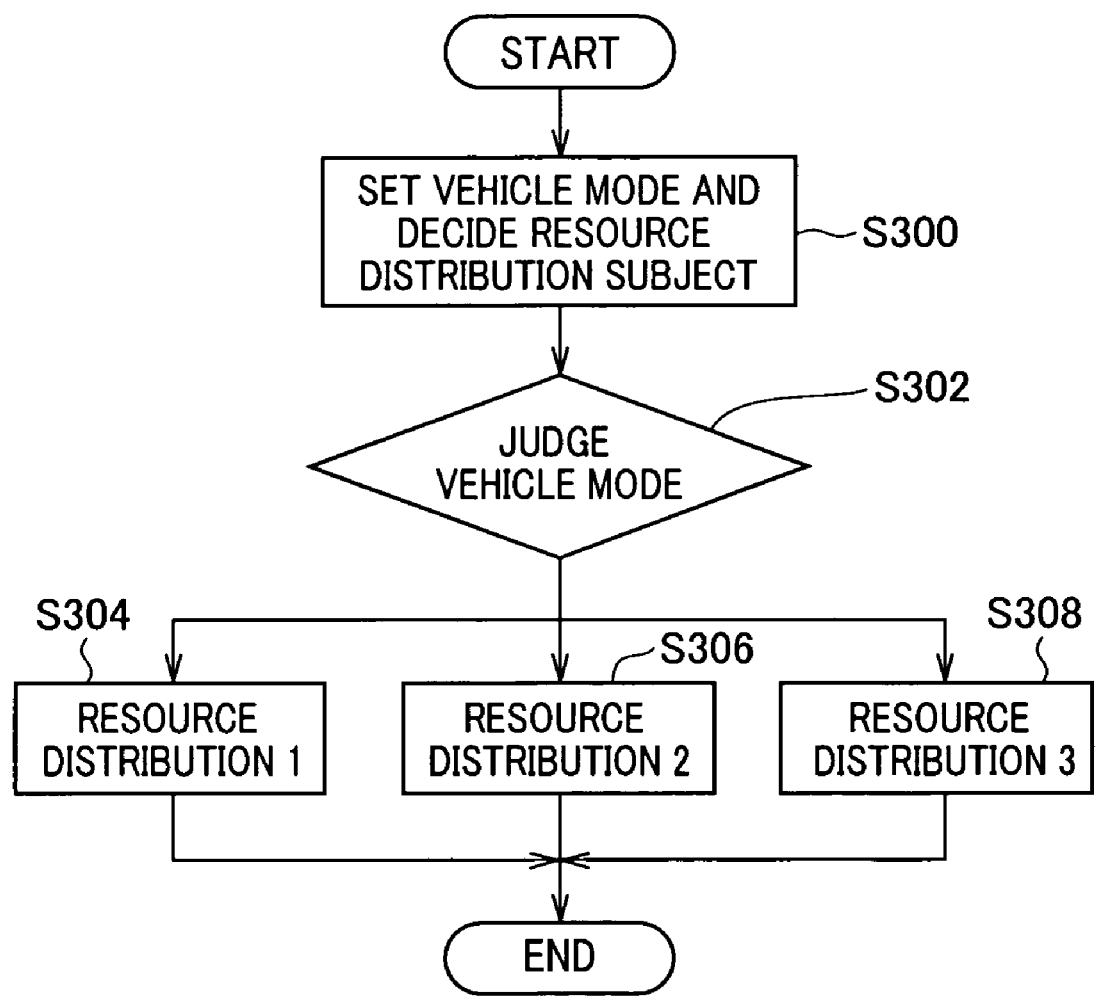
FIG. 3 is a flowchart of a resource management routine 1.

At step S300 in FIG. 3, the intra-box 200 sets the vehicle mode based on the vehicle environment in which the vehicle is placed. The intra-box 200 decides the resources to be distributed, and the control units or the coordination control unit 80 to which the resources are distributed in each vehicle mode.

The intra-box 200 judges the vehicle mode set at step S300 (step S302). At steps S304, S306, and S308 that branch out from step S300 in accordance to the vehicle modes, the intra-box 200 distributes the appropriate amount of resources based on the vehicle mode to the control units or the coordination control unit 80 and ends the routine.

(Resource Management Routine 2)

Figure 4:
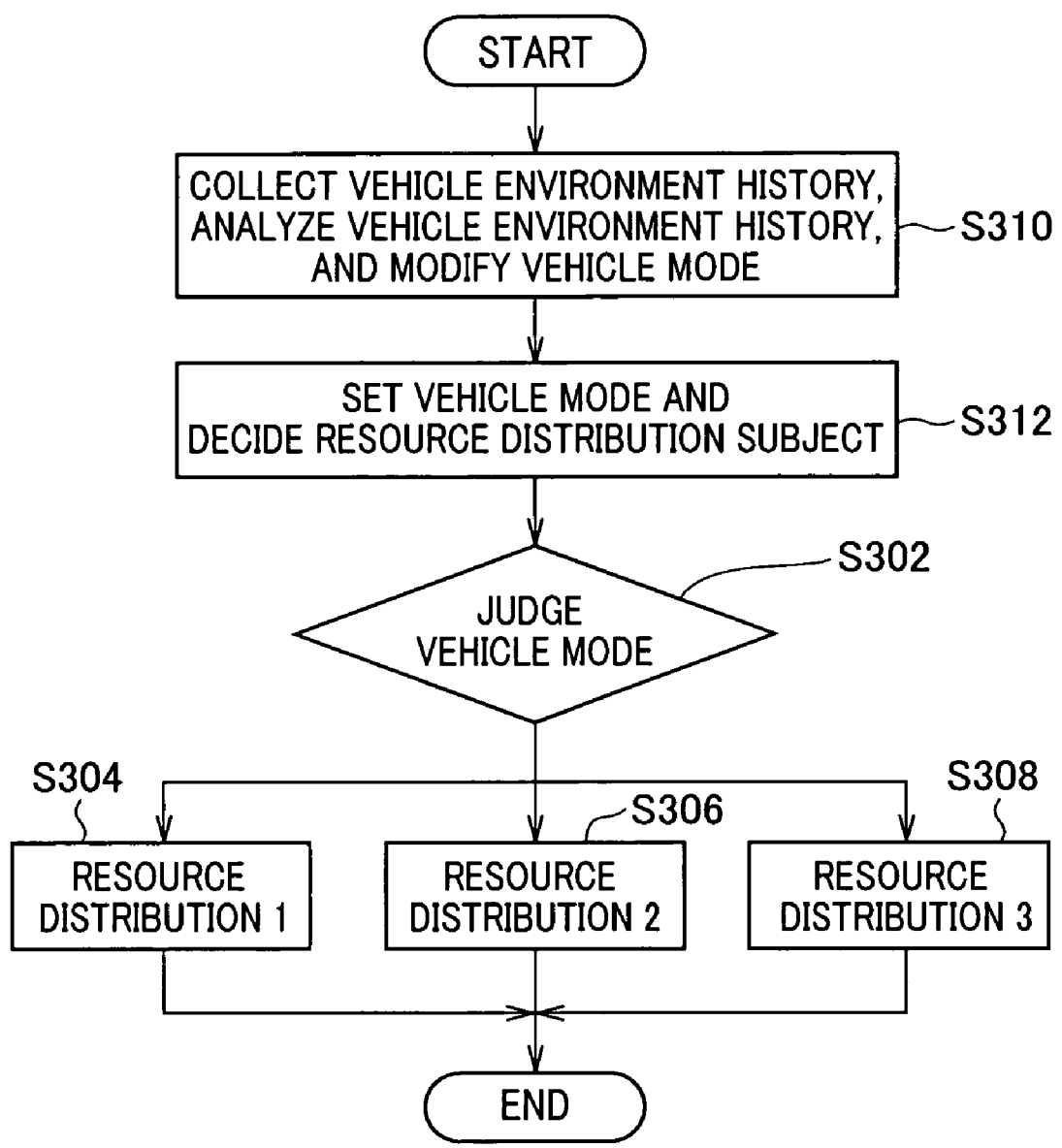
FIG. 4 is a flowchart of a resource management routine 2.

At step S310 in FIG. 4, the intra-box 200 switches the vehicle modes by collecting the history of the vehicle environments and analyzing the history. The intra-box 200 modifies the amount of resources distributed, the order of priority in which the resources are distributed, and the like in each vehicle mode, based on the analysis results.

At step S312, the intra-box 200 sets the vehicle mode based on the results of the modification performed at step S310, and decides the resources to be distributed and the control units or the coordination control unit 80 to which the resources are distributed in each vehicle mode. The process following step S312 is the same as that of the resource managing routine 1.

(Resource Managing Routine 3)

Figure 5:
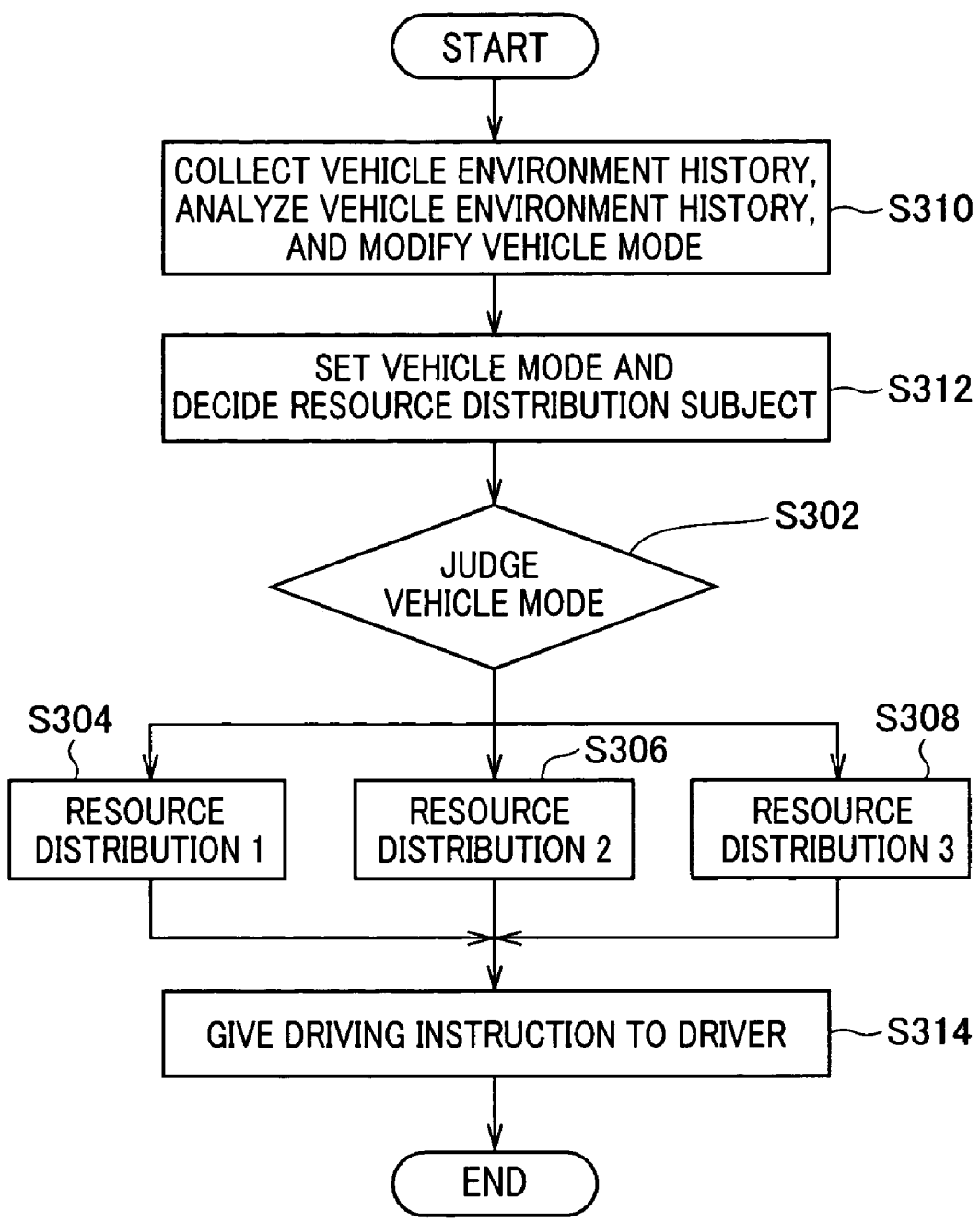
FIG. 5 is a flowchart of a resource management routine 3.

In a resource managing routine 3 shown in FIG. 5, after distributing the appropriate amount of resources to the control units based on the vehicle mode at steps S304, S306, and S308 of the resource management routine 2 in FIG. 4, the intra-box 200 instructs the driver to drive the vehicle such as to reduce the amount of resources consumed in accordance to the vehicle mode at step S314, and completes the routine.

(Resource Managing Routine 4)

Figure 6:
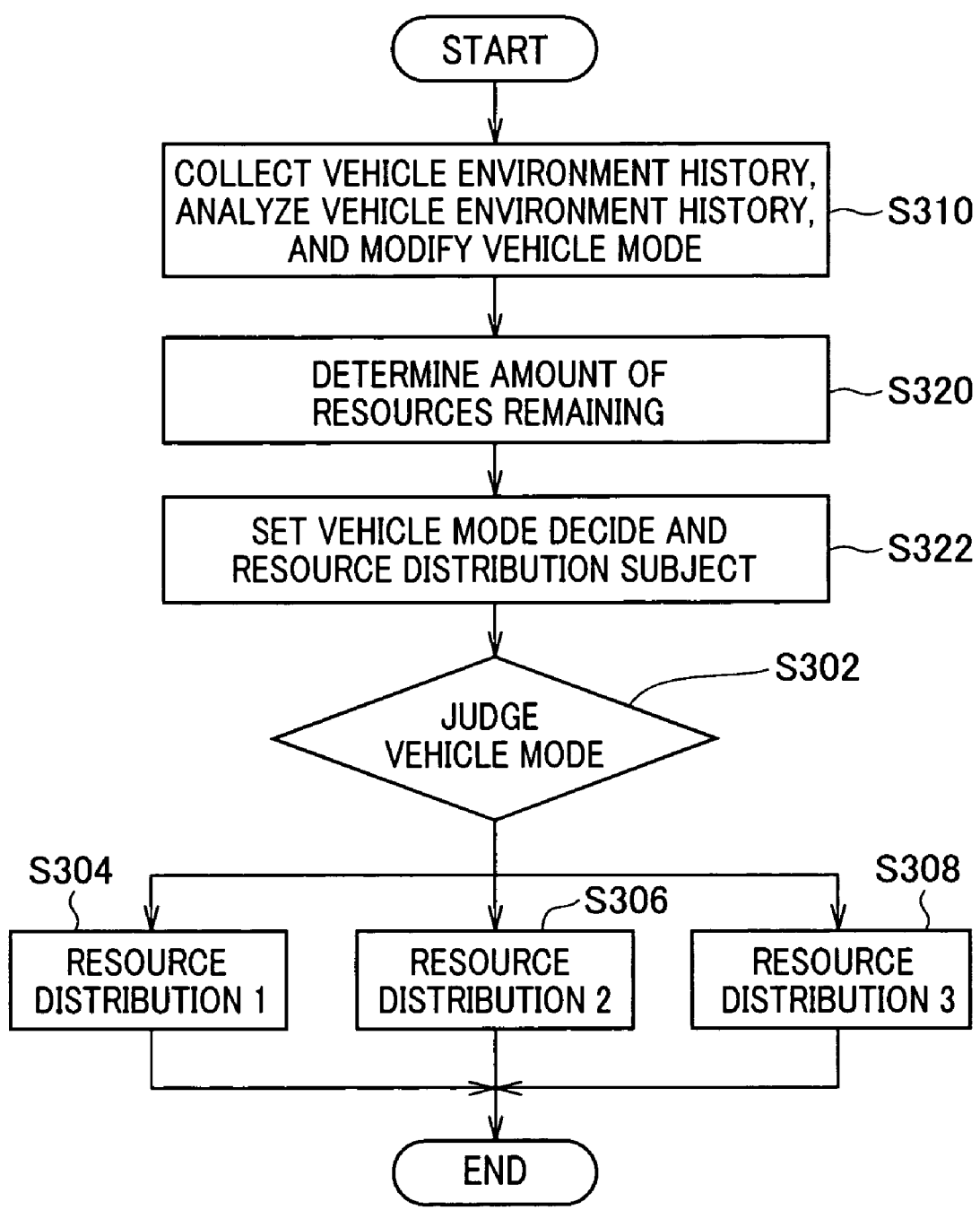
FIG. 6 is a flowchart of a resource management routine 4.

In a resource managing routine 4 in FIG. 6, the amount of resources remaining is determined between steps S310 and S302 of the resource managing routine 2 in FIG. 4 (step S320).

Then, at step S322, the intra-box 200 sets the vehicle mode based on the results of the modifications to the vehicle mode at step S310, and the amount of resources remaining determined at step S320. The intra-box 200 decides the resources to be distributed, and the control units or the coordinate control means 80 to which the resources are distributed in each vehicle mode. The process following step S322 is the same as that of the resource managing routine 2.

(Resource Management Routine 5)

Figure 7:
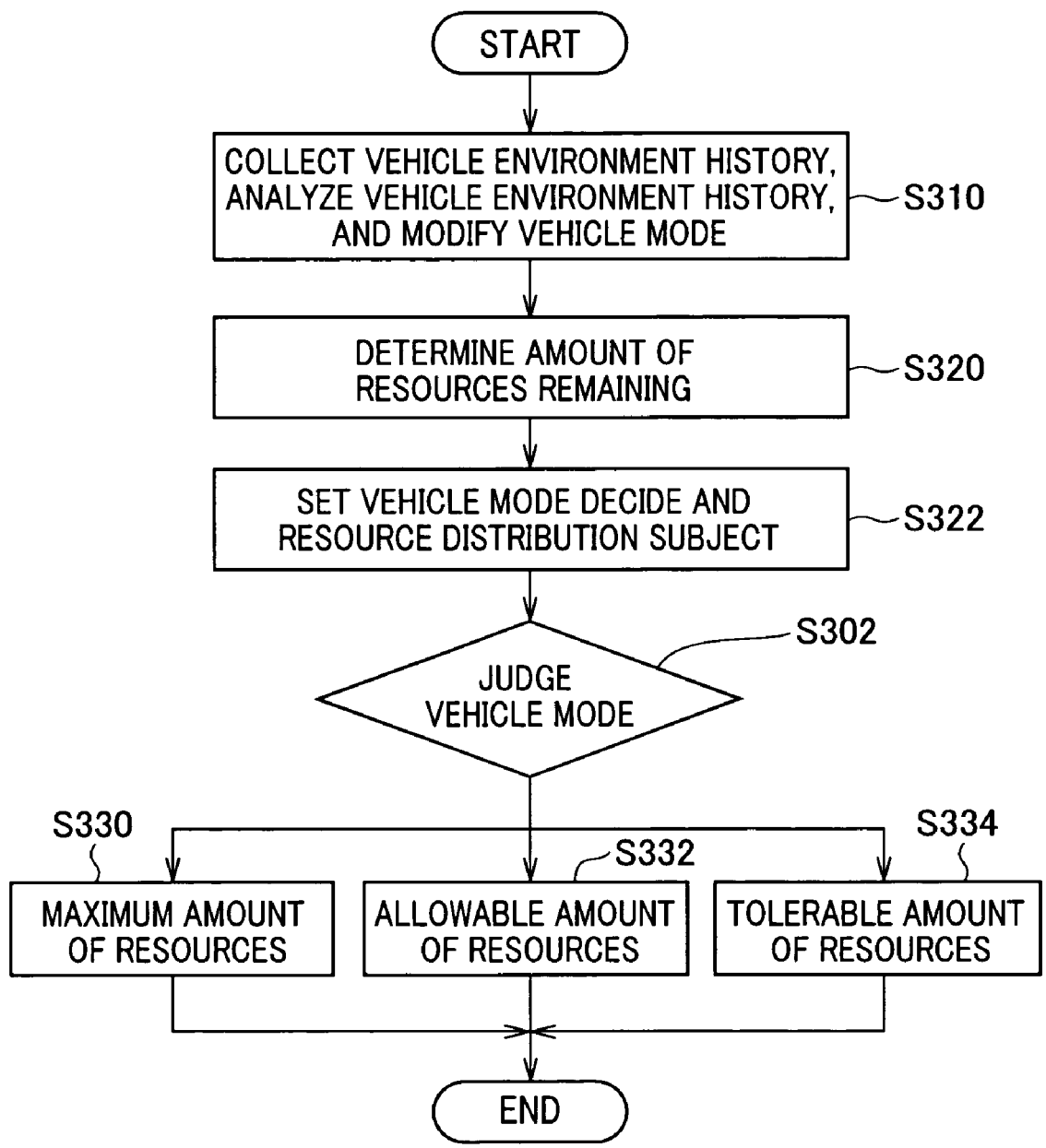
FIG. 7 is a flowchart of a resource management routine 5.

In a resource management routine 5 in FIG. 7, after judging the vehicle mode at step S302, the intra-box 200 instructs the control units that can switch the resource usage amount to switch the resource usage amount in accordance with the set vehicle mode. The intra-box 200 distributes the overall amount of resources indicated by the request value at step S330. At step S332, the intra-box 200 distributes an amount of resources that is not the overall amount indicated by the request value, but an allowable amount required for normal control. At step S334, the intra-box 200 distributes an amount of resources insufficient for performing normal control, but with which control is not impossible to performed.

(Resource Management Routine 6)

Figure 8:
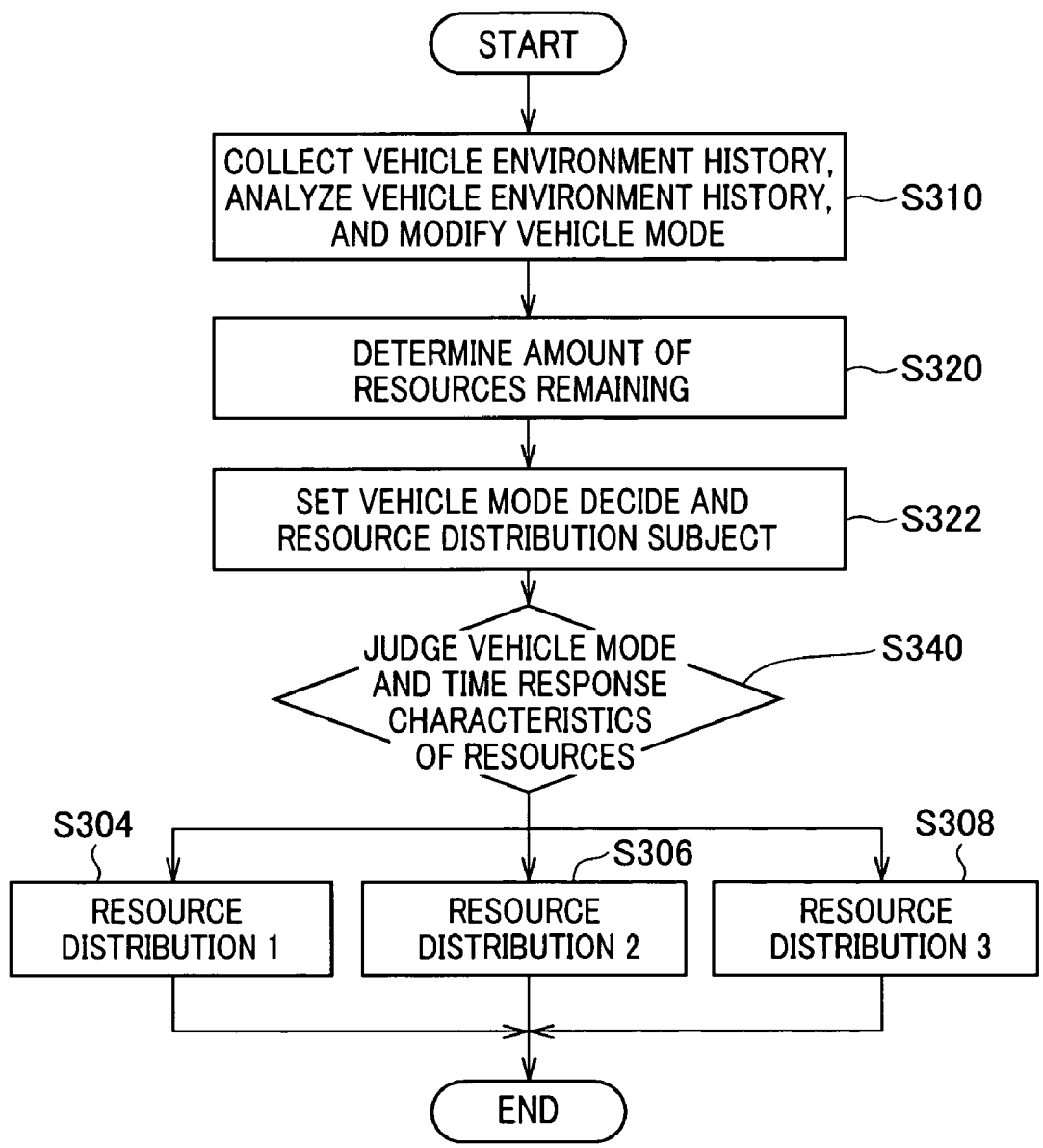
FIG. 8 is a flowchart of a resource management routine 6.

In a resource management routine 6 in FIG. 8, in place of step S302 of the resource management routine 2 in FIG. 6, at step S340, the intra-box 200 supplies the resources from an optimal supplier in accordance with the usage request value and consumption characteristics of the control units, based on the vehicle mode and the time response characteristics of when the resources are supplied.

(Abnormality Judgment Routine 1)

Figure 9:
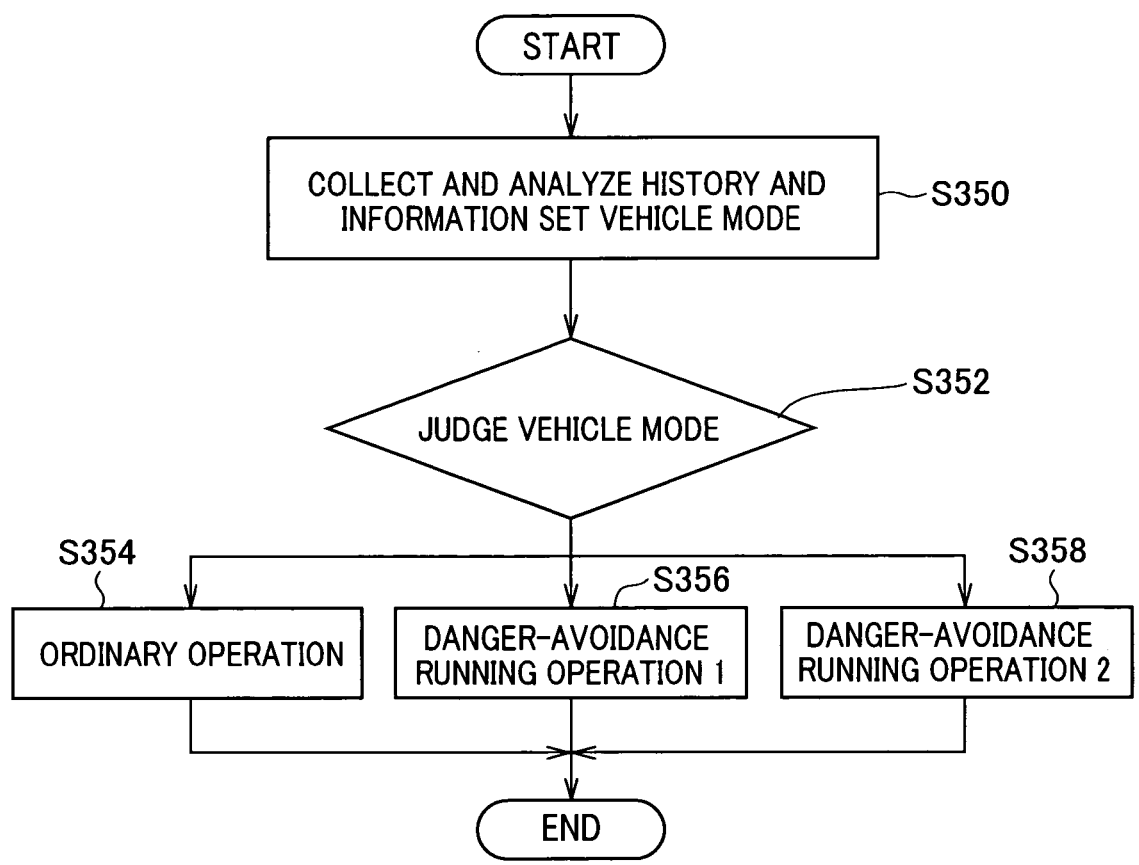
FIG. 9 is a flowchart of an abnormality judgment routine 1.

At S350 of an abnormality judgment routine 1 in FIG. 9, the intra-box 200 collects the vehicle environment history information and analyzes whether the range and pattern of the collected history information is that of the normal state or that of an abnormal state. When the history information is normal, the intra-box 200 sets the vehicle mode to that in which an instruction is given to operate normally. When an abnormality is found in the history information, the intra-box 200 sets the vehicle mode to a plurality of abnormal modes in which danger-avoidance running operations are performed depending on the type of abnormality.

Then, the intra-box 200 judges the vehicle mode set at step S350 (step S352). At steps S354, S356, and S358, the intra-box 200 adjusts the behavior controls performed by the control units based on the vehicle mode.

The intra-box 200 gives an instruction to perform normal operation based on the normal mode set when the history information is normal at step S354. At steps S356 and S358, the intra-box 200 gives instructions to perform different danger-avoidance running operations based on the different abnormal modes set in accordance with the type of abnormality occurring in the history information.

(Abnormality Judgment Routine 2)

In the abnormality judgment routine 2 in FIG. 10, the intra-box 200 classifies the plurality of abnormal modes in which the danger-avoidance running operations are performed based on the type of abnormality in the history information into a theft mode (step S360), a maintenance mode (step S364), and a vehicle abnormality mode (S368), and performs an appropriate danger-avoidance running operation in each abnormal mode.

In the theft mode, the intra-box 200 prohibits behavior control of the subject performed by the control units. As a result, the intra-box 200 can prohibit the vehicle from running in the theft mode (step S362).

In the maintenance mode, the intra-box 200 instructs the control units to perform behavior control in which the behavior of the subject judged to require maintenance is suppressed, thereby suppressing deterioration and wear of the subject to be controlled to a minimum.

In the vehicle abnormality mode other than the theft mode and the maintenance mode, the intra-box 200 gives an instruction to perform a danger-avoidance running operation that restricts running of the vehicle by restricting the amount of fuel injection and the like (S370).

At sS372, the intra-box 200 displays whether the vehicle is in the normal mode or the abnormal mode based on the history information.

The intra-box 200 at sS372 preferably notifies the vehicle owner that a theft has occurred by a mobile phone and the like in the theft mode, and notifies the vehicle owner that maintenance is required by illumination of a warning lamp or by an audio message in the maintenance mode. In the vehicle abnormality mode other than the theft mode and the maintenance mode, the intra-box 200 preferably notifies the vehicle owner that running of the vehicle is restricted by illumination of a warning lamp or by an audio message.

(Vehicle Mode Setting Routine)

At S380 of a vehicle mode setting routine in FIG. 11, the intra-box 200 collects the vehicle environment history information for each driver and analyzes the collected history information.

At step S382, the intra-box 200 estimates an occurrence probability of a certain vehicle environment based on a theory of probability, such as the Markov process, and calculates conditions added to the vehicles modes set as the initial value and conditions for modifying the vehicle modes.

Then, at step S384, the intra-box 200 sets the appropriate vehicle mode for each driver based on the additional condition and the modification conditions of the vehicle modes calculated at step S382. As a result, based on the usage probability of the vehicle environment in the history each driver, the vehicle mode that minimizes the amount of resources consumed can be set for each driver.

As described above, in the intra-box 200 according to the embodiment, the mode setting unit 210 sets the vehicle mode based on the vehicle environment. Based on the set vehicle mode, the control adjusting unit 220 adjusts the behavior controls performed by the control units. The resource managing unit 230 manages the resources shared among the control units. As a result, the intra-box 200 can set the appropriate vehicle mode accordingly, based on the changing vehicle environments, appropriately control the behavior controls performed by the control units based on the set vehicle mode, and appropriately manage the shared resources.

Because the control adjusting unit 220 including the resource managing unit 230 and the mode setting unit 210 are provided in the intra-box 200 that is independent from the control units and the coordinate control means 80, even when a change occurs in the configuration of the control units, the intra-box 200 can adjust the behavior controls performed by the control units and manage the shared resources with little amount of adjustment.

Other Embodiments

According to the above-described embodiment, a vehicle control system in which a plurality of control units are disposed is described. However, the vehicle control system can be that including only a single control unit. In this system configuration as well, the same intra-box used when the plurality of control units are present can be used. The behavior controls of the subjects performed by the control units can be adjusted based on the vehicle mode.

In this way, the present invention is not limited to the above-described embodiment and can be applied to various embodiments within the scope of the invention.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A vehicle control apparatus comprising:
a mode setting unit provided independently from a plurality of control units that control behavior of systems to be controlled which are mounted on a vehicle, every one of functional domains of the vehicle realized by the systems, and formed to set a vehicle mode depending on a vehicle environment in which the vehicle is present; and
a control adjusting unit provided independently from the control units, wherein:
the mode setting unit and the control adjusting unit are provided independently from a coordination control unit that controls coordination dependent on the behavior controls performed by the plurality of control units,
the control adjusting unit adjusts the coordinated control performed by the coordination control units based on the vehicle mode, and includes a resource managing unit that manages resources used by the control units and the coordination control unit based on the vehicle mode and a resource distribution instruction given by the coordination control unit, the resource distribution instruction giving an instruction to distribute the resources among the control units based on the vehicle mode, and
the resource managing unit manages the resources based on remaining amounts of the resources, in which the remaining amounts are predicted every one of a plurality of types of time spans which are different from each other.

2. The vehicle control apparatus according to claim 1, wherein the vehicle environment is at least one of a running state of the vehicle and a peripheral condition of the vehicle.

3. The vehicle control apparatus according to claim 1, wherein the mode setting unit sets the vehicle mode based on a history of the vehicle environments.

4. The vehicle control apparatus according to claim 3, wherein, when an abnormality is found in the history, of the vehicle environments, the mode setting unit sets the vehicle mode to an abnormal mode in which an instruction is given to perform a danger-avoidance running operation.

5. The vehicle control apparatus according to claim 4, wherein, in the abnormal mode, an instruction is given to perform an initially set danger-avoidance operation.

6. The vehicle control apparatus according to claim 4, wherein the mode setting unit sets a plurality of abnormal modes in which instructions are given to perform different danger-avoidance running operations, based on the abnormality in the history of the vehicle environments.

7. The vehicle control apparatus according to claim 6, wherein one of the plurality of abnormal modes is a vehicle theft mode in which an instruction is given to stop running the vehicle.

8. The vehicle control apparatus according to claim 7, wherein, in the vehicle theft mode, an instruction is given to notify a vehicle owner of a theft.

9. The vehicle control apparatus according to claim 6, wherein one of the plurality of abnormal modes is a maintenance mode in which an instruction is given to suppress behavior of the subject to be controlled.

10. The vehicle control apparatus according to claim 9, wherein, in the maintenance mode, an instruction is given to notify a vehicle owner that maintenance is required to be performed.

11. The vehicle control apparatus according to claim 3, wherein the mode setting unit sets the vehicle mode for each driver based on the history of the vehicle environments of each driver.

12. The vehicle control apparatus according to claim 11, wherein the mode setting unit analyzes a usage probability of at least one vehicle environment in the history for each driver, and sets the vehicle mode for each driver based on the analysis results.

13. The vehicle control apparatus according to claim 12, wherein the mode setting unit acquires a history of at least one vehicle environment for each driver from map information.

14. The vehicle control apparatus according to claim 1, wherein the resource managing unit instructs the driver to drive the vehicle in accordance with the vehicle mode.

15. The vehicle control apparatus according to claim 1, wherein the resource managing unit manages at least energy in the vehicle.

16. The vehicle control apparatus according to claim 15, wherein at least one type of energy is electrical energy.

17. The vehicle control apparatus according to claim 16, wherein electrical energy has at least two or more types of input and output time response characteristics, and the resource managing unit manages electrical energy based on the input and output time response characteristics.

18. The vehicle control apparatus according to claim 15, wherein at least one type of energy is heat energy.

19. The vehicle control apparatus according to claim 15, wherein at least one type of energy is fuel for an internal combustion engine mounted on the vehicle.

20. The vehicle control apparatus according to claim 16, wherein the resource managing unit instructs the control units that can switch operating speeds to switch an operating speed based on the vehicle mode, or the vehicle mode and at least one of an amount of energy remaining and a usage request value of the resources from the control units.

21. The vehicle control apparatus according to claim 1, wherein the resource managing unit manages the resources to be distributed to the control units based on the vehicle mode, or the vehicle mode and at least one of an amount of energy remaining and a usage request value of the resources from the control units.

22. The vehicle control apparatus according to claim 21, wherein the resource managing unit instructs the control units that can switch an amount of resources consumed to switch the amount of resources consumed based on the vehicle mode, or the vehicle mode and at least one of an amount of energy remaining and a usage request value of the resources from the control units.

23. A vehicle control system comprising:
a plurality of control units that control behavior of systems to be controlled which are mounted on a vehicle for each one of functional domains of the vehicle realized by the systems;
a mode setting unit provided independently from the plurality of control units in the vehicle, and formed to set a vehicle mode depending on a vehicle environment in which the vehicle is present; and
a control adjusting unit provided independently from the control units in the vehicle, wherein:
the mode setting unit and the control adjusting unit are provided independently from a coordination control unit that controls coordination ent on the behavior controls performed by the plurality, of control
the control adjusting unit adjusts the coordinated control performed by the coordination control unit based on the vehicle mode, and includes a resource managing that manages resources used by the control units and the coordination control unit based on the vehicle mode and a resource distribution instruction given by the coordination control unit, the resource distribution instruction giving an instruction to distribute the resources among the control units based on the vehicle mode, and
the resource managing unit manages the resources based on remaining amounts of the resources, in which the remaining amounts are predicted every one of a plurality of types of time spans which are different from each other.

24. The vehicle control apparatus according to claim 1, wherein the resource managing unit manages at least energy necessary for the vehicle, the energy being one type of the resources.

25. The vehicle control apparatus according to claim 24, wherein the one type of the energy is electrical energy which is consumed as electrical power by electric loads mounted in the vehicle.

26. The vehicle control apparatus according to claim 25, wherein the electrical power is supplied by power supply devices under at least two or more types of input and output time responses of the power supply devices, and
the resource managing unit further manages supply of the electrical power based on the input and output time responses.

27. The vehicle control apparatus according to claim 26, wherein the power supply devices are two power supply devices one of which input and output time responses is faster than the other of which input and output time responses, and
the resource managing unit manages the supply of the electrical power such that the power supply device having the shorter input and output time response supplies the electrical power when it is required to start the supply of the electrical power in a shorter period of time, and the power supply device having the longer input and output time response supplies the electrical power when it is required to start the supply of the electrical power in a longer period of time.

28. The vehicle control apparatus according to claim 27, wherein the power supply device having the shorter input and output time response is a capacitor to be charged and the power supply device having the longer input and output time response is a battery, both of the capacitor and the battery being mounted in the vehicle.

* * * * *